Patented June 30, 1942

2,288,198

UNITED STATES PATENT OFFICE 2,288,198

ETHERS OF MONO-HYDROXY-HALOGEN-1.4-BENZOQUINONES AND A PROCESS OF PREPARING THEM

Gerhard Langbein, Hofheim in Taunus, Germany, assignor to General Aniline & Film Corporation, a corporation of Delaware No Drawing. Application November 29, 1938, Serial No. 242,917. In Germany December 4, 1937

6 Claims. (Cl. 260—396)

The present invention relates to ethers of mono-hydroxy-halogen-1.4 - benzoquinones and to a process of preparing them.

It is known that tetrahalogen-1.4-benzoquinones may be transformed into di-alkoxy-dihalogen-1.4-benzoquinones by treating a tetrahalogen-1.4-benzoquinone with an alcohol in the presence of an acid-binding agent, such as caustic potash, two halogen atoms being thereby exchanged.

I have found that only one halogen atom is exchanged in 1.4-benzoquinones containing more than one halogen atom as, for instance, those of the following general formula

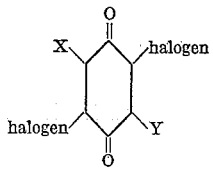

wherein X and Y represent members of the group consisting of hydrogen, halogen and methyl, when the benzoquinone compound is heated together with an alcohol in the presence of a diluent, which may be the same alcohol, and in the presence of an acid-binding agent in a quantity of not more than 1 equivalent calculated upon the amount of the quinone used. The ethers of mono-hydroxy-halogen-1.4 - benzoquinones thus obtained, for instance, of the following general formula:

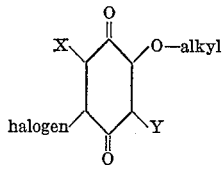

wherein X and Y represent members of the group consisting of hydrogen, halogen and methyl, are new valuable parent materials for the preparation of dyestuffs. (cp. the co-pending U. S. patent applications Serial Nos. 242,918, 242,919 and 242,920.)

The following examples serve to illustrate the invention, but they are not intended to limit it thereto; the parts are by weight:

(1) 24.6 parts of chloranil are heated, while stirring, in 500 parts of methanol. 8.2 parts of sodium acetate are introduced at 60° C. and the whole is then heated to boiling for a short time, until the chloranil has dissolved. The sodium chloride formed is eliminated by filtering with suction while hot, and the filtrate is allowed to cool. The 2-methoxy-3.5.6-trichloro-1.4-benzoquinone of the following formula

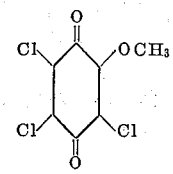

which crystallises from the cooled filtrate in the form of orange leaflets, is filtered with suction, washed with a small amount of methanol and dried. Recrystallised from methanol it melts at 183° C.–185° C.

(2) 42.4 parts of bromanil are heated at 70° C., while stirring, in 500 parts of ethanol. 6.9 parts of potassium carbonate are then introduced and the whole is heated to boiling for some minutes. After cooling, the solution is filtered with suction. After concentrating the filtrate, ethoxy-tribromo-1:4-benzoquinone of the following formula

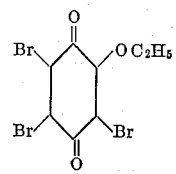

crystallised therefrom in the form of brownish needles.

(3) 22.6 parts of trichloro-tolu-1.4-quinone are heated at 60° C., while stirring, in 500 parts of methanol. 8.2 parts of sodium acetate are then introduced, the whole is heated to boiling, for about 10 minutes, filtered with suction, while hot, and allowed to cool. The methoxy-dichloro-tolu-1.4-quinone, which crystallises from the filtrate in the form of yellow leaflets, is filtered with suction, washed and dried. Recrystallised from methanol, it is obtained in the form of shining, yellow leaflets melting at 208° C., to 210° C.

(4) 24.6 parts of chloranil, 250 parts of n-butanol and 9.8 parts of potassium acetate are heated together to boiling, while stirring. After cooling, the potassium chloride formed is eliminated by filtering with suction. The butoxy-trichloro-1.4-benzoquinone of the following formula:

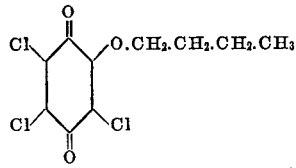

may be isolated by concentrating the filtrate. It is, however, also possible to use the filtrate as such for further treatment.

(5) 19.1 parts of 2.5-dichloro-6-methyl-1.4-benzoquinone are heated to boiling for some minutes together with 100 parts of methyl alcohol while adding 8.2 parts of sodium acetate. After cooling, the reaction mixture is diluted with a small quantity of water whereupon methoxy-chloro-toluquinone crystallizes in the form of orange-brown leaflets. The reaction mixture may also be used, without dilution with water, for further treatment, for instance, according to the process of my co-pending U. S. patent application Serial No. 242,918, entitled Amino-alkoxy-1.4-benzoquinones and their derivatives and a process of preparing them.

I claim:

1. The process which comprises heating a benzoquinone compound of the general formula

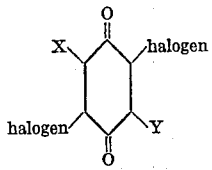

wherein X and Y represent members of the group consisting of hydrogen, halogen and methyl, with a saturated aliphatic alcohol in the presence of a diluent and of one mol equivalent of an acid binding agent calculated on the basis of the quinone compound, whereby only one halogen atom is replaced by an alkoxy group.

2. The process which comprises heating a benzoquinone compound of the general formula

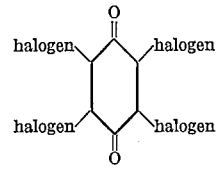

with a saturated aliphatic alcohol in the presence of a diluent and of one mol equivalent of an acid binding agent calculated on the basis of the quinone compound, whereby only one halogen atom is replaced by an alkoxy group.

3. The process which comprises heating chloranil with an excess of methyl alcohol in the presence of one mol equivalent of sodium acetate calculated on the basis of the quinone compound, whereby only one halogen atom is replaced by an alkoxy group.

4. The process which comprises heating bromanil with an excess of ethyl alcohol in the presence of one mol equivalent of potassium carbonate calculated on the basis of the quinone compound, whereby only one halogen atom is replaced by an alkoxy group.

5. The process which comprises heating chloranil with an excess of n-butyl alcohol in the presence of one mol equivalent of potassium acetate calculated on the basis of the quinone compound, whereby only one halogen atom is replaced by an alkoxy group.

6. The compound of the formula

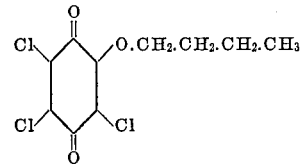

forming orange-coloured leaflets melting at 84° C. to 85° C.

GERHARD LANGBEIN.